US 9,168,866 B2

(12) United States Patent
Baek

(10) Patent No.: US 9,168,866 B2
(45) Date of Patent: Oct. 27, 2015

(54) AUTOMATIC LIGHTING SYSTEM AND METHOD FOR VEHICLE

(71) Applicant: Hyundai Motor Company, Seoul (KR)

(72) Inventor: Hyelim Baek, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 126 days.

(21) Appl. No.: 14/107,460

(22) Filed: Dec. 16, 2013

(65) Prior Publication Data

US 2014/0265841 A1 Sep. 18, 2014

(30) Foreign Application Priority Data

Mar. 12, 2013 (KR) ........................ 10-2013-0026369

(51) Int. Cl.
*B60R 16/03* (2006.01)
*B60Q 3/02* (2006.01)

(52) U.S. Cl.
CPC ............ *B60Q 3/0293* (2013.01); *B60Q 3/0226* (2013.01)

(58) Field of Classification Search
USPC .................................................... 315/76–84
See application file for complete search history.

(56) References Cited

U.S. PATENT DOCUMENTS

| 4,352,518 | A | * | 10/1982 | Prince et al. ............... 296/97.12 |
| 4,734,831 | A | * | 3/1988 | Keyser et al. ................. 362/492 |
| 5,442,530 | A | * | 8/1995 | Viertel et al. ................. 362/137 |
| 5,666,028 | A | * | 9/1997 | Bechtel et al. ................. 315/82 |
| 8,538,636 | B2 | * | 9/2013 | Breed ............................. 701/49 |
| 2005/0040774 | A1 | * | 2/2005 | Mueller et al. ............... 315/291 |
| 2005/0281041 | A1 | * | 12/2005 | Kaphengst et al. ........... 362/492 |
| 2010/0090494 | A1 | * | 4/2010 | Marcus et al. ............... 296/97.5 |
| 2010/0225248 | A1 | * | 9/2010 | Cruickshank et al. ........ 315/297 |
| 2014/0286028 | A1 | * | 9/2014 | Haraguchi .................... 362/492 |
| 2015/0097483 | A1 | * | 4/2015 | Huelke et al. ................. 315/77 |

FOREIGN PATENT DOCUMENTS

| JP | 2007-069808 A | 3/2007 |
| JP | 2011-213170 A | 10/2011 |
| KR | 20-0130681 | 7/1996 |

* cited by examiner

*Primary Examiner* — Brandon S Cole
(74) *Attorney, Agent, or Firm* — Mintz Levin Cohn Ferris Glovsky and Popeo, P.C.; Peter F. Corless

(57) ABSTRACT

An automatic lighting system and method for a vehicle are provided and the automatic lighting system includes a sun visor switch operated by a controller and configured to be turned on when a sun visor is lowered and turned off when the sun visor is raised. A mirror cover sensor detects an opened state or a closed state of a mirror cover while the sun visor is lowered, and the mirror cover covers a mirror attached to the sun visor. In addition, an interior lamp that includes at least one light-emitting diode (LED) is operated by the controller to be turned off when a vehicle runs and turned on when the vehicle stops while the mirror cover is opened.

14 Claims, 3 Drawing Sheets

FIG. 2

| Mode | Description |
|---|---|
| Constant turn-on mode (ON) | Constant turn-on in the state that mirror cover is opened |
| Automatic turn-on mode (AUTO) | Automatic turn-on or turn-off according to vehicle speed in the state that mirror cover is opened (ON/OFF) |
| Constant turn-off mode (OFF) | Constant turn-off in the state that mirror cover is closed |

AUTOMATIC LIGHTING SYSTEM AND METHOD FOR VEHICLE

CROSS-REFERENCE TO RELATED APPLICATION

This application claims priority to and the benefit of Korean Patent Application No. 10-2013-0026369 filed in the Korean Intellectual Property Office on Mar. 12, 2013, the entire contents of which are incorporated herein by reference.

BACKGROUND (a) Field of the Invention

The present invention relates to an automatic lighting system and method for a vehicle.

(b) Description of the Related Art

A sun visor for a vehicle is installed on each of the upper sides of a driver seat and a passenger seat to provide shade from sunlight. To improve convenience, a mirror is attached to the inner side of the sun visor, and a lamp that interlocks with the sun visor is installed on the roof of the vehicle for use of the mirror in the dark. Thus, the sun visor may be used to provide shade from sunlight and provides the mirror. A lamp that interlocks with a sun visor of the related art may be automatically turned on when the sun visor is lowered or may be turned on when a switch is operated after the sun visor is lowered.

However, according to the related art, when a vehicle is running and the sun visor is lowered, light from the lamp may distract a driver, thereby preventing safe driving. In addition, the sun visor may be raised while the vehicle is being driven and may be lowered when the mirror is no longer being used, which may cause frequent operation and disruption to the driver. Therefore, since an ON or OFF operation on the switch is additionally required, concentration of a driver may be degraded.

The above information disclosed in this section is only for enhancement of understanding of the background of the invention and therefore it may contain information that does not form the prior art that is already known in this country to a person of ordinary skill in the art.

SUMMARY

The present invention provides an automatic lighting system and method for a vehicle that automatically controls light of a lamp that interlocks with a sun visor based on vehicle speed and ambient brightness.

An exemplary embodiment of the present invention provides an automatic lighting system for a vehicle, including: a sun visor switch configured to be turned on when a sun visor is lowered and turned off when the sun visor is raised; a mirror cover sensor configured to detect an opened state or a closed state of a mirror cover while the sun visor is lowered, wherein the mirror cover covers a mirror attached to the sun visor; an interior lamp that has at least one light-emitting diode (LED); and a control unit configured to turn off the interior lamp when a vehicle runs (e.g., is traveling) and turn the interior lamp on when the vehicle stops while the mirror cover is opened.

The automatic lighting system may include: a mode setting unit executed by the control unit and configured to set the interior lamp in an automatic turn-on mode or in a constant turn-on mode based on speed of the vehicle; a gateway configured to receive a vehicle speed signal from a transmission control unit (TCU) and determine a running state or stopping state of the vehicle; and an auto-light sensor configured to sense ambient brightness of the vehicle and determine day or night (e.g., light according to the time of day). The control unit may be configured to operate the interior lamp to a maximum brightness when the auto-light sensor senses day and to be dimmed when sensing night.

The gateway may be configured to generate a stop information signal when the vehicle speed is less than about 2 Km/h and transmit the stop information signal to the control unit. The interior lamp may include at least one white-light-emitting diode. The control unit may be configured to turn off the interior lamp when the mirror cover is closed.

Another exemplary embodiment of the present invention provides an automatic lighting method executed by an automatic lighting system for a vehicle, including: a) turning on a sun visor switch when a sun visor is lowered; b) detecting an opened state of a mirror cover of the sun visor while the sun visor switch is turned on; c) determining whether the vehicle is stopped when an automatic turn-on mode is set, wherein the automatic turn-on mode is a mode in which an interior lamp is turned on while stopping; and d) turning off the interior lamp when the vehicle runs and turning on the interior lamp when the vehicle stops.

The automatic lighting method may include operating the interior lamp to a maximum brightness when an auto-light sensor senses day and operating the interior lamp to be dimmed when the auto-light sensor senses night. In addition, the automatic lighting method may include operating the interior lamp to be constantly turned on when the mirror cover is opened when a constant turn-on mode is set. Further, the automatic lighting method may include operating the interior lamp to be constantly turned off when the mirror cover is closed.

According to an exemplary embodiment of the present invention, since an interior lamp may be automatically turned on while stopping, degradation of driving concentration due to frequent operation of the interior lamp may be prevented, and a the mirror of a sun visor may be used while stopping. In addition, it may be possible to decrease blinding light (e.g., light that distracts a driver) by dimming brightness of an interior lamp using an auto-light sensor when the interior lamp is automatically turned on at night. Further, it may be possible to constantly leave an interior lamp turned off to use a sun visor to block light when a mirror of a sun visor is not used.

BRIEF DESCRIPTION OF THE DRAWINGS

FIG. 2 is an exemplary operation mode table for an interior lamp according to an exemplary embodiment of the present invention.

DETAILED DESCRIPTION

Figure 1:
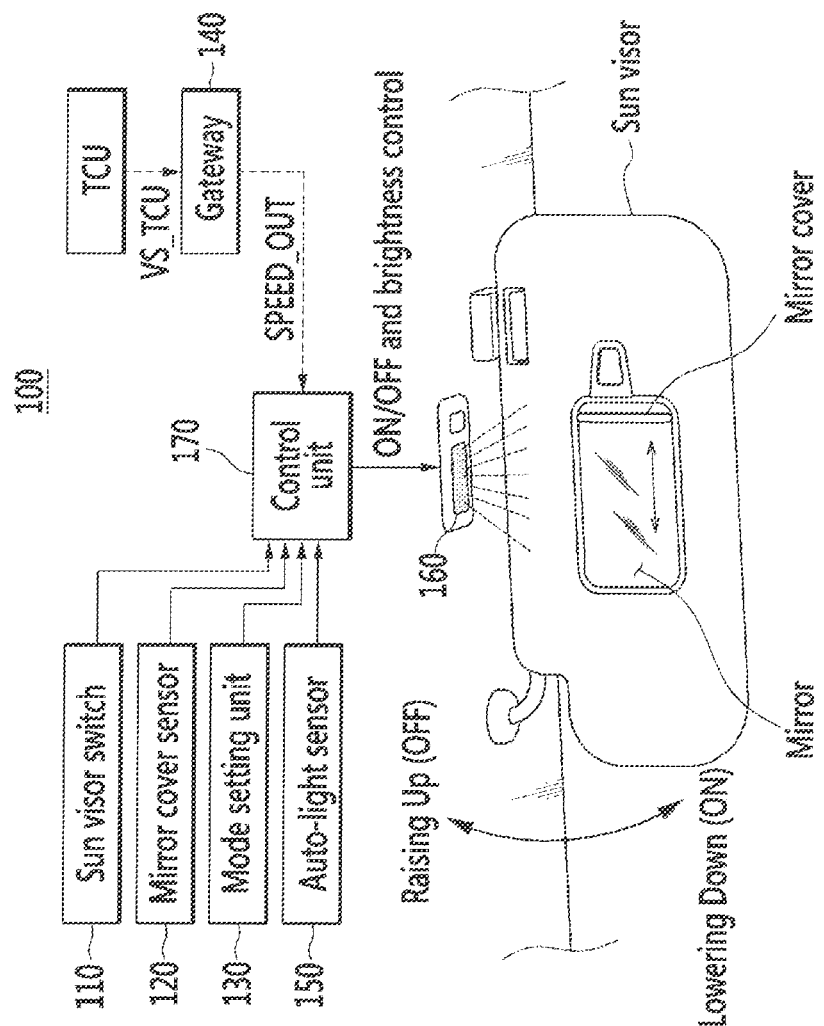
FIG. 1 is an exemplary diagram of an automatic lighting system for a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the following detailed description, exemplary embodiments of the present invention have been shown and described, simply by way of illustration. As those skilled in the art would realize, the described exemplary embodiments may be modified in various different ways, all without departing from the spirit or scope of the present invention. Accordingly, the drawings and description are to be regarded as illustrative in nature and not restrictive. Like reference numerals designate like elements throughout the specification.

Unless explicitly described to the contrary, the terms "-er", "-or", and "module" described in the specification mean units for processing at least one function and operation, and can be implemented by hardware components or software components and combinations thereof.

Hereinafter, an automatic lighting system and method for a vehicle according to exemplary embodiments of the present invention will be described in detail with reference to the drawings.

FIG. 1 shows an exemplary diagram of an automatic lighting system for a vehicle according to an exemplary embodiment of the present invention. Referring to FIG. 1, an automatic lighting system 100 may include a sun visor switch 110, a mirror cover sensor 120, a mode setting unit 130, a gateway 140, an auto-light sensor 150, an interior lamp 160, and a controller 170.

The sun visor switch 110, executed by the controller 170, may be turned on when a sun visor is lowered, and may be turned off when the sun visor is raised to an original position. The sun visor may be installed on a roof portion over a driver's seat and a roof portion over a passenger's seat, respectively. In addition, ON and OFF operations of the sun visor switch 110 may depend on turning movements of the sun visor that is lowered and raised.

The automatic lighting system 100 may be activated when the sun visor is lowered causing the sun visor switch 110 to be turned on. Thus, the sun visor being lowered and power being supplied to the automatic lighting system may be understood as having the same meaning.

The mirror cover sensor 120, executed by the controller 170, may be configured to detect a position of a mirror cover opening or closing a mirror attached on the sun visor by a sliding movement. The mode setting 130, executed by the controller 170, may be configured to set the interior lamp 160 to be automatically turned on or to be constantly turned on according to a user's operation.

FIG. 2 shows an exemplary operation mode table for an interior lamp according to an exemplary embodiment of the present invention. Referring to FIG. 2, the automatic lighting system 100 may set a constant turn-on mode, an automatic turn-on mode, and a constant turn-off mode. For this operation, the mode setting unit 130, executed by the controller 170, may be configured to selectively set the automatic turn-on mode or the constant turn-on mode by operation of a predetermined switch.

According to the automatic turn-on mode, when the mirror cover is opened, the interior lamp 160 may be automatically turned off while a vehicle is running and may be automatically turned on while stopping, by the controller 170. In the constant turn-on mode, the controller 170 may be configured to operate the interior lamp 160 to remain turned on when the mirror cover is in an opened state. Since the constant turn-off mode in which the interior lamp 160 remains turned off may be set when the mirror cover is in a closed state, a separate switch for the constant turn-off mode may be omitted.

The gateway 140 may be configured to receive a vehicle speed signal (VS_TCU) from a transmission control unit (TCU) and may be configured to determine whether the vehicle is running or stopping. When speed of the vehicle is less than about 2 Km/h, the gateway 140 may be configured to determine that the vehicle is stopping, thus, the gateway 140 may be configured to generate a stop information signal and transmit the signal to the controller 170.

The auto-light sensor 150, executed by the controller 170, may be configured to sense ambient brightness of the vehicle to determine day and night. The interior lamp 160 may include at least one light-emitting diode or at least one white-light-emitting diode which is an ultra-small-sized and semi-permanent, and consumes a substantially low amount of energy.

Furthermore, the controller 170 may be configured to automatically operate the interior lamp 160 interlocked with the sun visor based on vehicle speed and ambient brightness. Particularly, the controller 170 may be configured to operate the interior lamp 160 to be turned off while the vehicle is running and to be turned on while the vehicle is stopping, when the mirror cover is in an opened state. In addition, the controller 170 may be configured to turn on and turn off of the interior lamp 160 according to the vehicle speed and may be configured to operate brightness of the interior lamp 160 based on day and night lighting. For example, the controller 170 may be configured to operate the interior lamp 160 to a maximum brightness during the day and operate the interior lamp 160 to about 70% of the maximum brightness at night, based on a day and night determining signal (AUTO_LIGHT_STAT) transmitted from the auto-light sensor 150 while the interior lamp is being turned on.

Hereinafter, an automatic lighting method for a vehicle according to an exemplary embodiment of the present invention that may be executed by the automatic lighting system 100 will be described in detail.

Figure 3:
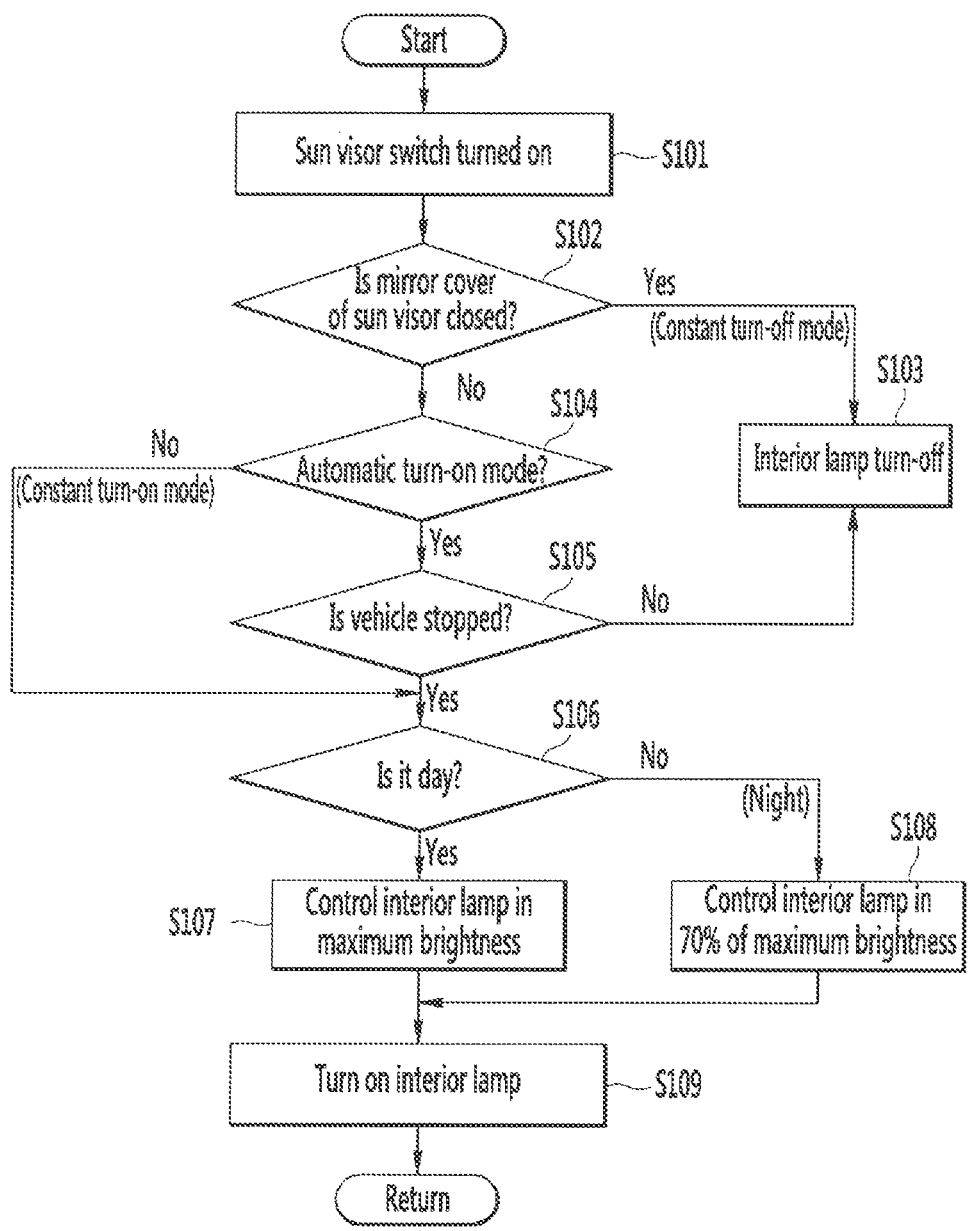
FIG. 3 is an exemplary flowchart of an automatic lighting method for a vehicle according to an exemplary embodiment of the present invention.

FIG. 3 shows an exemplary flowchart of an automatic lighting method for a vehicle according to an exemplary embodiment of the present invention. Referring to FIG. 3, the automatic lighting system 100, in an ignition on state of a vehicle, may be configured to start an automatic lighting operation when the sun visor is lowered and the sun visor switch is turned on at step 101.

When the mirror cover of the sun visor is in an opened state (e.g., is not in a closed state), the mode setting unit 130 of the automatic lighting system 100 may be configured to determine whether a lighting mode for the interior lamp 160 is an automatic turn-on mode at step 104. When the lighting mode for the interior lamp 160 is the automatic turn-on mode, the automatic lighting system 100 may be configured to determine whether the vehicle is running or stopping according to the speed of the vehicle at step S105.

The automatic lighting system 100 may be configured to determine that the vehicle is stopping when a stop information signal (SPEED_OUT=1) is output from the gateway 140 at step S105. When the vehicle is stopping, the automatic lighting system 100 may be configured to determine whether the lighting corresponds to day or night based on ambient brightness at step S106. When the automatic lighting system 100 determines day lighting based on a result sensed by the auto-light sensor 150, the automatic lighting system 100 may be configured to operate the interior lamp 160 to be at the maximum brightness at step S107 and step S109. When the mirror cover is in a closed state at step S102, the automatic lighting system 100 may be configured to determine the lighting mode to be in the constant turn-off mode, thus turning off the interior lamp 160 at step S103. In addition, when the vehicle is not in the stopping state at step S105, the automatic lighting system 100 may be configured to turn off the interior lamp 160 at step S103.

Furthermore, when the lighting mode is not in the automatic turn-on mode at step 104, the automatic lighting system 100 may be configured to determine the lighting mode to be in the constant turn-on mode, and thus may be configured to perform steps S106 to S109. In particular, the automatic lighting system 100 may be configured to operate the brightness of the interior lamp 160 in the constant turn-on mode according to day and night lighting. When the automatic lighting system 100 determines night lighting based on a result sensed by the auto-light sensor 150 at step S106, the automatic lighting system 100 may be configured to dim the brightness of the interior lamp 160 to be about 70% of the maximum brightness at step S108 and step S109.

According to an exemplary embodiment of the present invention, since an interior lamp may be automatically turned on while stopping, degradation of driving concentration due to frequent operation of the interior lamp may be prevented, and a driver and/or passenger may use a mirror of a sun visor while stopping.

Furthermore, according to an embodiment of the present invention, since an interior lamp may be automatically turned on while stopping without a separate operation, a driver may conveniently use the light while stopping, and it may be possible to decrease blinding light by dimming brightness of the interior lamp using an auto-light sensor when the interior lamp is automatically turned on during the night. In addition, by turning off an interior lamp when a mirror cover of a sun visor is in a closed state, the sun visor may be fully used as a light blocker.

The above-described embodiments may be realized through a program for realizing functions that correspond to the configuration of the exemplary embodiments or a recording medium for recording the program in addition through the above-described device and/or method, which is obvious to a person skilled in the art.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

| Description of Symbols | |
|---|---|
| 100: Automatic lighting system | 110: Sun visor switch |
| 120: Mirror cover sensor | 130: Mode operating unit |
| 140: Gateway | 150: Auto-light sensor |
| 160: Interior lamp | 170: Control unit |

What is claimed is:

1. An automatic lighting system for a vehicle, comprising:
a sun visor switch executed by a controller and configured to be turned on when a sun visor is lowered and turned off when the sun visor is raised;
a mirror cover sensor operated by the controller and configured to detect an opened state or a closed state of a mirror cover while the sun visor is lowered, wherein the mirror cover covers a mirror attached to the sun visor; and
an interior lamp that includes at least one light-emitting diode (LED) and is operated by the controlled to be turned off when a vehicle runs and turned on when the vehicle stops while the mirror cover is opened.

2. The automatic lighting system of claim 1, further comprising:
a gateway configured to receive a vehicle speed signal from a transmission control unit (TCU) and determine a running state or stopping state of the vehicle; and
an auto-light sensor operated by the controller and configured to sense ambient brightness of the vehicle and determine day or night lighting,
wherein the controller is further configured to set the interior lamp in an automatic turn-on mode or in a constant turn-on mode based on speed of the vehicle.

3. The automatic lighting system of claim 2, wherein the controller is configured to operate the interior lamp to a maximum brightness when the auto-light sensor senses day lighting and to operate the interior lamp be dimmed when the auto-light sensor senses night lighting.

4. The automatic lighting system of claim 2, wherein the gateway is further configured to generate a stop information signal when the vehicle speed is less than about 2 Km/h and transmit the stop information signal to the controller.

5. The automatic lighting system of claim 1, wherein the interior lamp includes at least one white-light-emitting diode.

6. The automatic lighting system of claim 1, wherein the controller is further configured to maintain the interior lamp turned off when the mirror cover is closed.

7. An automatic lighting method executed by an automatic lighting system for a vehicle, comprising:
- turning on, by a controller, a sun visor switch when a sun visor is lowered;
- detecting, by the controller, an opened state of a mirror cover of the sun visor while the sun visor switch is turned on;
- determining, by the controller, whether the vehicle is stopped when an automatic turn-on mode is set, wherein the automatic turn-on mode is a mode in which an interior lamp is turned on while stopping; and
- turning off, by the controller, the interior lamp when the vehicle runs and turning on the interior lamp when the vehicle stops.

8. An automatic lighting method of claim 7, further comprising
- operating, by the controller, the interior lamp to a maximum brightness when an auto-light sensor senses day lighting; and
- operating, by the controller, the interior lamp to be dimmed when the auto-light sensor senses night lighting.

9. An automatic lighting method of claim 8, further comprising
- operating, by the controller, the interior lamp to be constantly turned on when the mirror cover is opened when a constant turn-on mode is set.

10. An automatic lighting method of claim 7, further comprising
- operating, by the controller, the interior lamp to be constantly turned off when the mirror cover is closed.

11. A non-transitory computer readable medium containing program instructions executed by a controller, the computer readable medium comprising:
- program instructions that turn on a sun visor switch when a sun visor is lowered;
- program instructions that detect an opened state of a mirror cover of the sun visor while the sun visor switch is turned on;
- program instructions that determine whether the vehicle is stopped when an automatic turn-on mode is set, wherein the automatic turn-on mode is a mode in which an interior lamp is turned on while stopping; and
- program instructions that turn off the interior lamp when the vehicle runs and turning on the interior lamp when the vehicle stops.

12. The non-transitory computer readable medium of claim 1, further comprising:
- program instructions that operate the interior lamp to a maximum brightness when an auto-light sensor senses day lighting; and
- program instructions that operate the interior lamp to be dimmed when the auto-light sensor senses night lighting.

13. The non-transitory computer readable medium of claim 12, further comprising:
- program instructions that operate the interior lamp to be constantly turned on when the mirror cover is opened when a constant turn-on mode is set.

14. The non-transitory computer readable medium of claim 11, further comprising:
- program instructions that operate the interior lamp to be constantly turned off when the mirror cover is closed.

* * * * *